United States Patent [19]

Crow, Jr.

[11] 4,094,373
[45] June 13, 1978

[54] METHOD AND APPARATUS FOR CONVERTING AN AGRICULTURE MACHINE TO A TRACTOR

[76] Inventor: Arthur F. Crow, Jr., R.F.D. 3, Milford, Ill. 60953

[21] Appl. No.: 793,751

[22] Filed: May 4, 1977

[51] Int. Cl.² .................................................. A01B 71/00
[52] U.S. Cl. .................................... 180/1 F; 172/292; 180/22; 180/24.07
[58] Field of Search ............... 172/292; 180/1 F, 1 R, 180/20, 21, 22, 23, DIG. 2

[56] References Cited

U.S. PATENT DOCUMENTS 3,527,315  9/1970  Hampton .............................. 180/51

*Primary Examiner*—Joseph F. Peters, Jr.
*Assistant Examiner*—Donn McGiehan

*Attorney, Agent, or Firm*—Peck & Peck

[57] ABSTRACT

A Cultivator Planter comprising a traction wheel assembly of substantial width which is releasably connected to a steerable portion to push the steerable portion. The traction wheel assembly comprising two sections which are releasably connected together for removing one section from the other to substantially reduce the width of the assembly so that the apparatus may be driven over the roads of conventional width. Lateral movement of the other section relative to the steerable portion causing the other section to be released from said steerable portion. Power mechanism coactive between the steerable portion and the one section of the traction wheel assembly to move the steerable portion laterally relative to the one section of the traction wheel assembly so that the section is in proper position behind the steerable portion.

12 Claims, 7 Drawing Figures

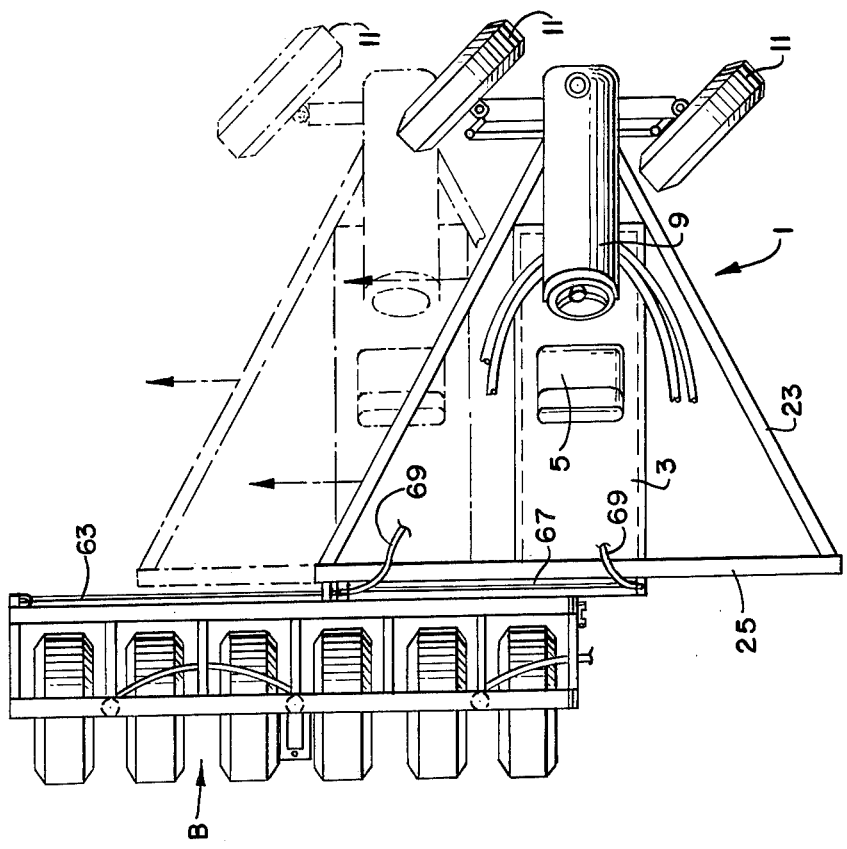
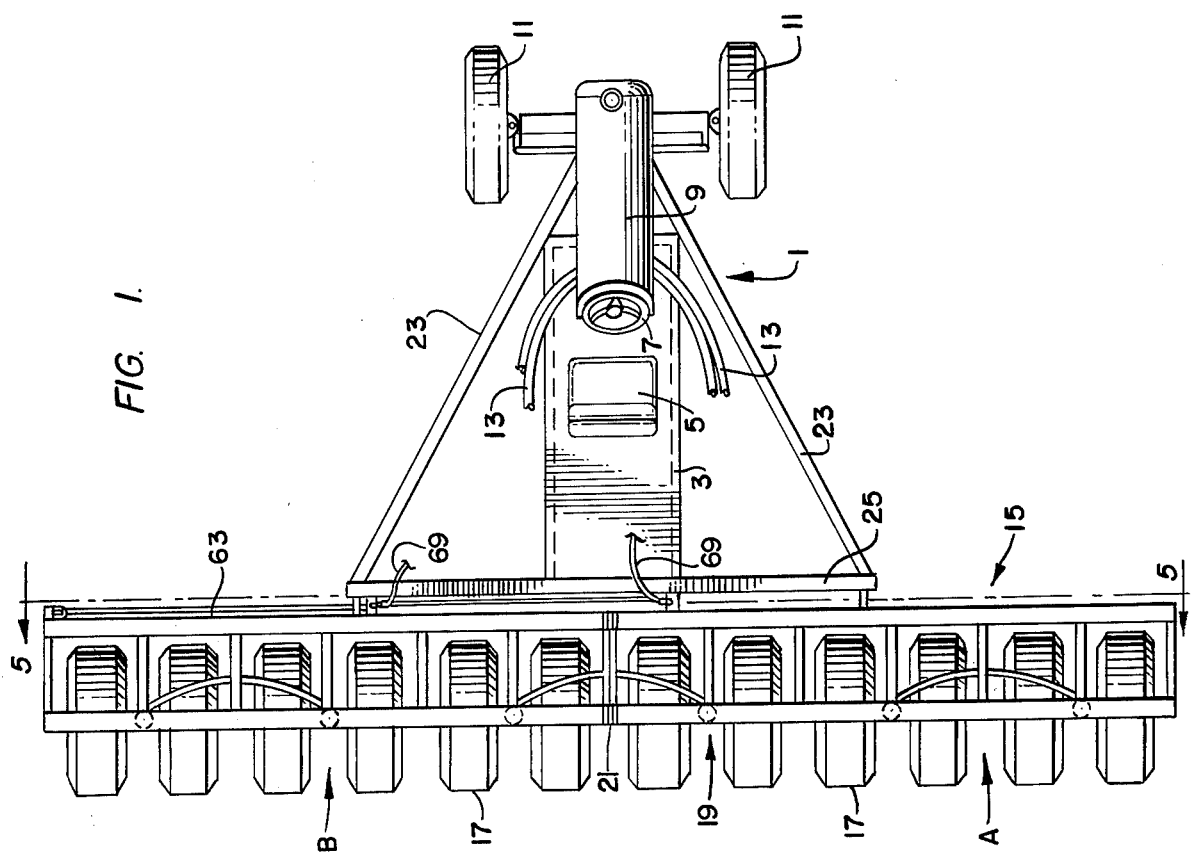

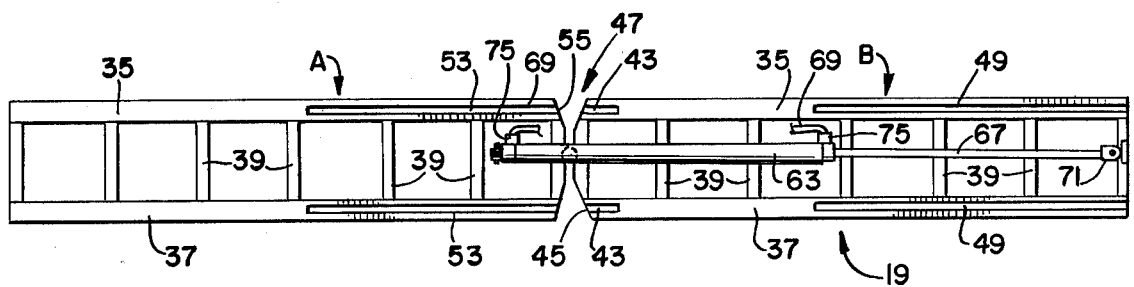
FIG. 5.
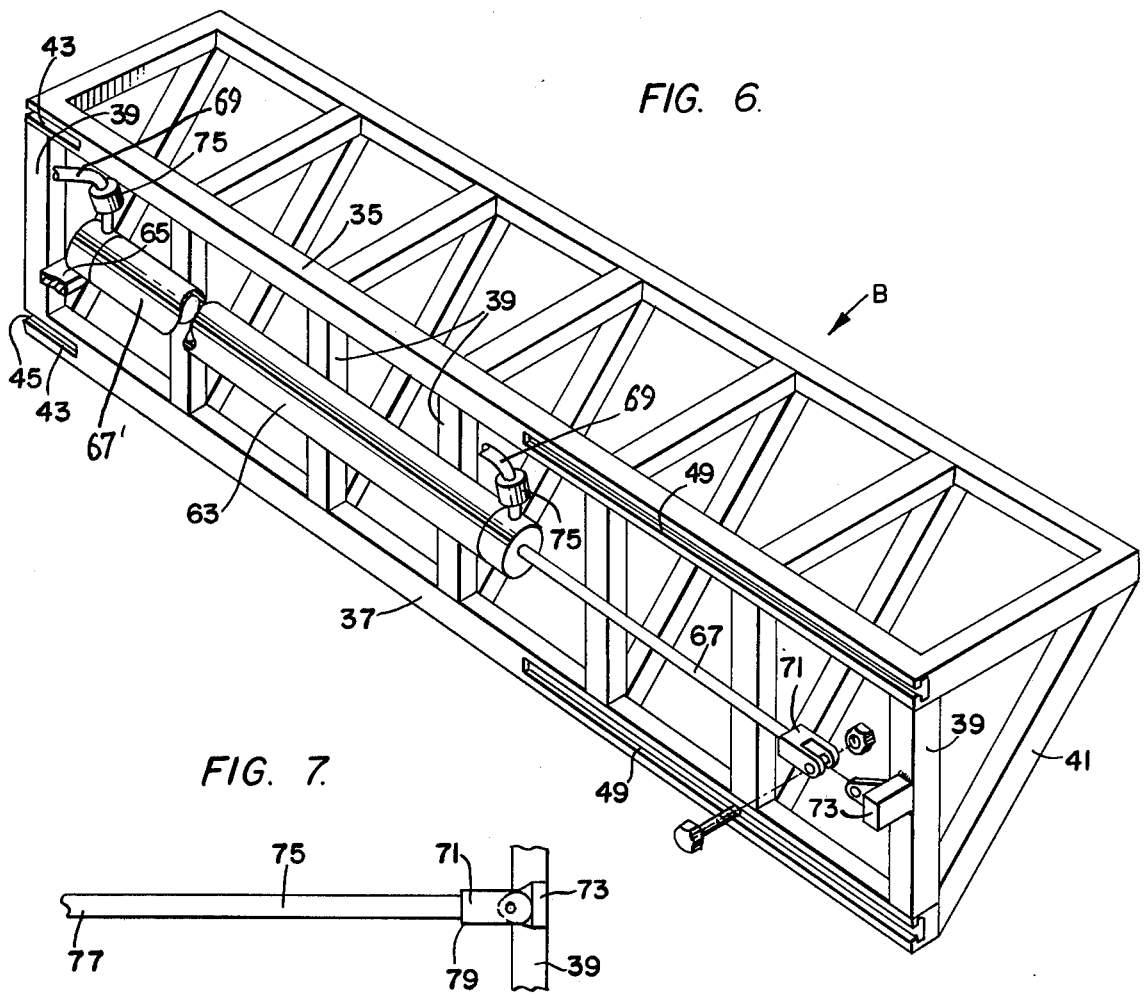
FIG. 6.
FIG. 7.

METHOD AND APPARATUS FOR CONVERTING AN AGRICULTURE MACHINE TO A TRACTOR

BRIEF SUMMARY OF THE INVENTION

Agriculture machines are known which comprise a plurality of traction wheels mounted in a traction wheel assembly frame which are releasably attached to a steerable portion which is propelled or pushed forwardly by the plurality of traction wheels. Each of the traction wheels is preferably independently operated by a hydraulic motor and the steerable portion of the machine provides a seat for the operator of the machine and at its forward end is mounted a pair of steerable wheels.

Since the traction wheel assembly is of substantial width and in one instance may include 12 independently operable wheels, it is desirable, for a variety of reasons, that the linearly disposed series of wheels be separable to thereby reduce the width of the traction wheel assembly when it is not to be used in its normal wide swath cultivating, planting, etc. operation. It is also highly desirable and economic to be able to use the agriculture machine as a tractor when it is not being used in its cultivating and planting operations.

The entire traction wheel assembly frame, when in operative position, comprises generally two sections which are pivotally and releasably connected together, in this instance, each such section comprises six independently operable traction wheels. The entire traction wheel assembly is mounted and connected to the steerable portion so that it may be pushed forwardly, and each section of the traction wheel assembly is slidably connected to the steerable portion of the machine so that when the two sections of the traction wheel assembly are disconnected they may be slid relative to the steerable portion and to each other so that one may be completely removed and released from the steerable portion and the other may, by automatic means to be described, be positioned in line with and directly behind and connected to the steerable portion for the propulsion thereof thereby providing a tractor which will operate in a more or less conventional manner.

Additional objects and advantages of the present invention will become more readily apparent to those skilled in the art when the following general statements and descriptions are read in the light of the appended drawings.

BRIEF DESCRIPTION OF THE DRAWINGS

FIG. 1 is a top plan view of the agricultural machine with the attached full traction wheel assembly for propelling the machine forwardly.

FIG. 2 is a top plan view of the machine illustrated in FIG. 1 with one section of the traction wheel assembly removed and the steerable wheels of the steerable portion turned to facilitate moving the steerable portion into operative position in line with and directly in front of the traction wheel section.

FIG. 5 is a view in rear elevation of the traction wheel assembly frame.

FIG. 6 is a view in perspective of the section of the traction assembly frame which will be used with the machine when the machine is used as a tractor.

FIG. 7 is a schematic view of a locking rod.

DETAILED DESCRIPTION

Figure 3:
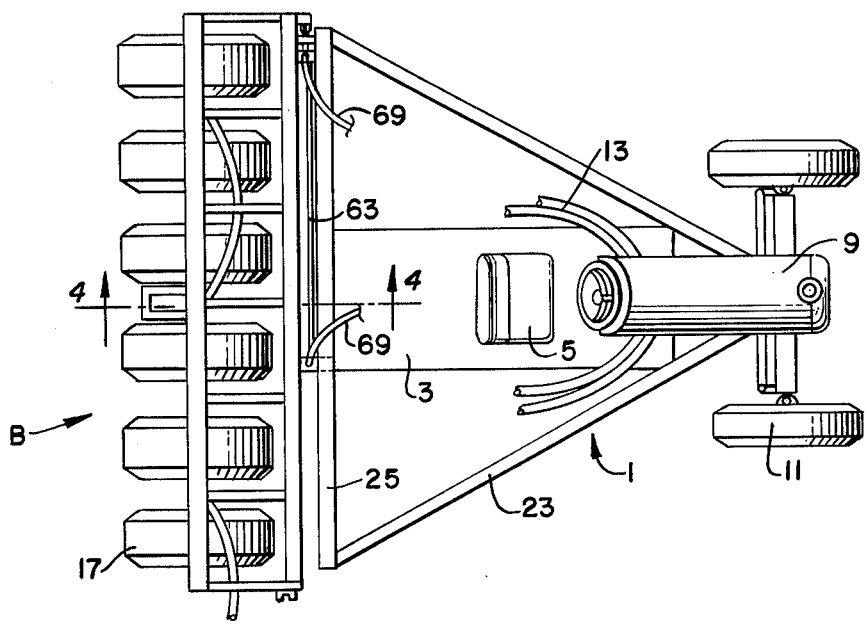
FIG. 3 is a top plan view of the steerable portion in proper position directly in front of the section of the traction wheel assembly providing an operable tractor.

In the accompanying drawings, I have used the numeral 1 to designate in its entirety the steerable or driven part or means of the invention. This steerable or the driven part of the machine includes a platform 3 upon which is mounted an operator's seat 5, a steering wheel 7 and a power unit 9 for supplying hydraulic power to the various operating components of the machine. A pair of forward wheels 11 are provided which are steerable by the operator of the machine. Any suitable number of hydraulic hoses 13 extend from the power unit for connection with the various operating elements of the machine.

In FIG. 1 of the drawings, I have illustrated the machine in its form for agriculture use in wide swath cultivating, planting, etc. and the machine in this condition includes a traction wheel assembly designated generally by the numeral 15. This traction wheel assembly comprises a plurality of indpendently operable traction wheels 17 which are operatively mounted in a traction wheel assembly frame 19 as particularly described and disclosed in my pending patent application Ser. No. 649,089 now U.S. Pat. No. 4,036,304 issued July 19, 1977. The traction wheel assembly frame is releasably connected in a manner to be described to the driven part 1 of the machine so that the traction wheels push the driven part 1 forwardly. The traction wheel assembly frame is formed in two sections A and B in a manner as disclosed in my aforesaid pending application. These two sections, A and B are separable at a substantially mid-point, as as 21.

A pair of tie rods 23 are fixed at their forward ends to the driven part 1 of the machine and divergently extend rearwardly therefrom and on their rearmost ends mount and are fixed to a rigid depending member 25.

The depending member 25 is provided with two pairs of sliding shoes and pivot connections to operatively connect the traction wheel assembly frame 19 to the forward or driven part 1 of the machine, the numeral 27 has been used to designate in their entireties the pivot and sliding shoe connections. A pair of upper horizontally spaced pivot and sliding shoe connections 27 are provided and are fixed to and extend rearwardly from the depending member 25 as is clearly disclosed in FIG. 4 of the drawings. A further pair of pivot and sliding shoe connections 27 are positioned adjacent the lower end of the depending member 25 and are in vertical alignment with the upper connections 27. Each connection 27 provides a rearwardly extending pin or stud 29 which is fixed in any suitable manner to the depending member 25. On the outer end of each pin or stud 29 is operatively mounted a pivoted shoe 31 which is dimensionally such that it will be freely and slidably received in slots (to be described) which are provided in the bar elements 35 and 37 of the traction wheel assembly frame 19.

The traction wheel assembly 15 is operatively mounted on a frame structure designated in its entirely by the numeral 19 and which I have called the traction wheel assembly frame and this frame structure, as pointed out above, is formed of two separable sections A and B. Each frame section, A and B, consists of a horizontally extending upper forward bar element 35. A pair of horizontally extending lower bar elements 37 are provided on each section A and B and are vertically coplaner with the upper bar elements 35. The bar elements 35 and 37 are mounted in proper vertically spaced position by means of a plurality of horizontally spaced extending elements 39. If desired a plurality of reinforcing struts 41 may be incorporated in the frame structure.

Consideration, particularly of FIGS. 5 and 6, of the drawings indicates that the upper and lower bar elements 35 and 37 of the frame section B are slotted as at 43 on their forward surfaces, and extend outwardly a limited distance along the bar elements and are open at the inner ends as at 45. The drawings clearly illustrate that each slot 43 extends linearly outwardly along the bar elements and that the open ends 45 face and are adjacent to the releasable connecting point between sections A and B, this point being indicated generally by the numeral 47.

As is clearly illustrated, particularly in FIG. 5 of the drawings the bar elements 35 and 37 of section B of the traction wheel assembly frame 19 are provided with further slots 49 which are similar in configuration and structure to the slots 43. The slots 49 extend from the outer ends of the bar elements inwardly a distance, however, the inner ends 51 of the slots 49 are spaced a substantial distance from the outer ends of the slots 43. Bar elements 35 and 37 of section A of the traction wheel assembly frame 19 are also provided on the forward sides with slots 53, such slots at their inner ends being open as at 55 and such inner ends face and are adjacent to the connecting point 47 between the sections A and B. It is to be appreciated that the slots 53 extend horizontally outwardly along the bar elements a limited distance which may be on the order of the midpoint of such bar elements of the section A.

Figure 4:
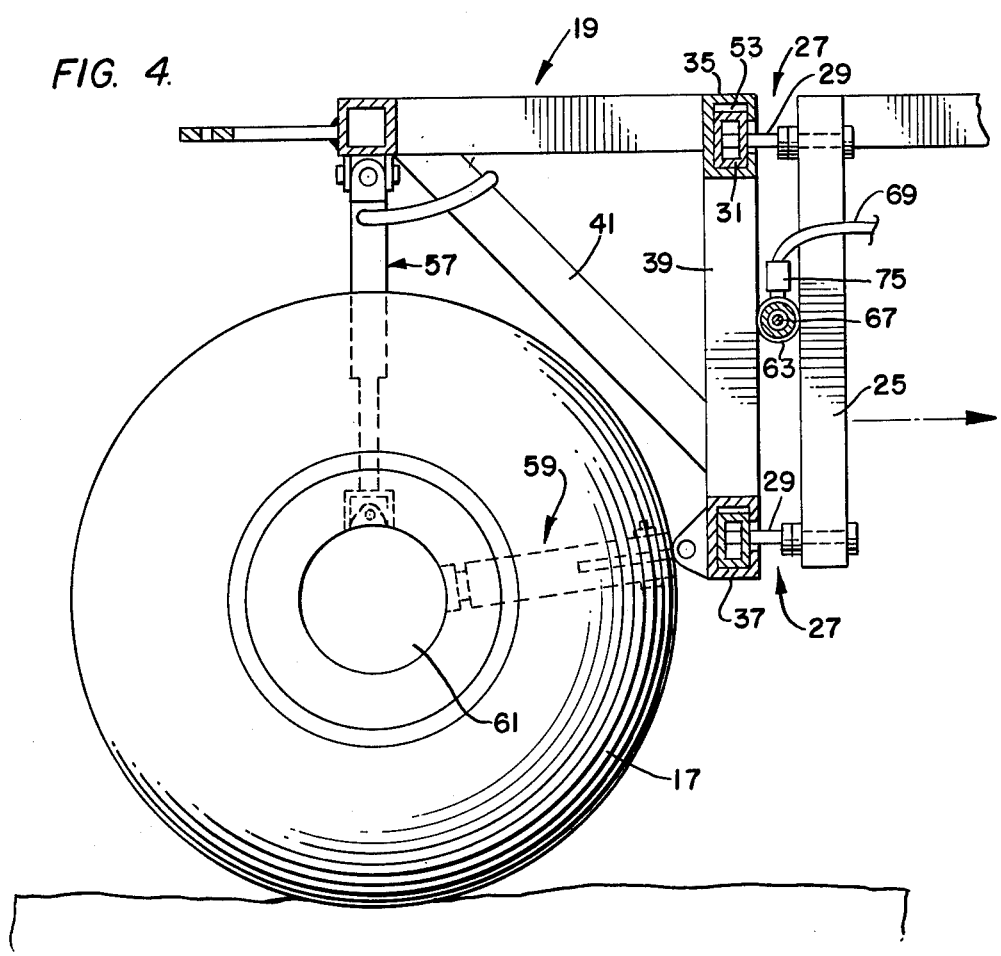
FIG. 4 is a line taken on 4—4 of FIG. 3.

It will be clear from consideration of FIG. 4 that the pivoted shoes 31 extend into the slots 53 and the slots 49.

Any suitable mounting and drive arrangement for the traction wheels 17 may be provided, for instance, a balancing means 57 may be provided for each wheel as well as a connecting means 59 which extends between a bar element 37 and the axle 61. It is to be recognized that one mounting and drive means for the traction wheels may comprise that which is shown and described in my pending patent application Ser. No. 649,089 now U.S. Pat. No. 4,036,304.

In FIG. 1 of the drawings I have disclosed the complete agricultural machine with all of the components thereof in operative positions for performing its agricultural use. Consideration of this drawing makes it clear that the traction wheel assembly and assembly frame 19 are of substantial width and such a plurality of traction wheels is not necessary in order to drive a tractor and such number of wheels rendering the traction wheel assembly of substantial width is unnecessary and undesirable for a variety of reasons.

When it is desired to convert the agricultural machine of FIG. 1 to the tractor illustrated in FIG. 3 the sections A and B of the tractor frame assembly are disconnected so that the sections A and B thereof are free and independent of one another and may be moved linearly with respect to one another, one of them being put aside and not used in the tractor conversion.

In order to facilitate this conversion operation I have devised a novel, ingenious and simple mechanism for moving one section into proper aligned tractor forming position behind the driven part of the machine.

A hydraulic cylinder 63 is connected or anchored at one end thereof to a projection 65 which is fixed to and extends rearwardly from the depending member 25. It is to be distinctly understood that this connected end 67' of the cylinder may be fixed directly to the depending member 25 or to any rearwardly extending element of the driven part 1 and still fall within the spirit and scope of this invention. A piston rod 67 extends from a piston (not shown) within the cylinder 63 which is operated by fluid to retract and project the piston rod. Fluid flow lines 69 extend into each end of the cylinder for the operation of the piston and the resultant retraction and projection of the piston rod 67. A clevis arragement 71 is provided on the end of the piston rod 67 and is operatively and releasably mounted on a bracket member 73 which is fixed to the traction wheel assembly frame 19 of the selected section B thereof. It will be appreciated that at one end the cylinder is fixed to any desirable and accessible part of the driven member such as the member 25, and the cylinder is releasably fixed to an end element 73 of the traction wheel assembly frame 19.

It is to be recognized that the operation of the piston and piston rod is controlled by the operator of the machine and tractor and since none of the operational features form a part of this invention it is not thought necessary to discuss in detail such operational features.

With the machine in its agricultural planting, etc. condition as illustrated in FIG. 1 of the drawings it is only necessary to practice the following method in converting the agricultural machine of FIG. 1 into the tractor illustrated in FIG. 3. When it is desired to so convert the agricultural machine into a tractor the two sections A and B of the traction wheel assembly are released from one another at the point 21 all as particularly discussed and disclosed in my pending patent application Ser. No. 649,089 now U.S. Pat. No. 4,036,304. In this instance following the release from one another of the two sections A and B the section A is removed from the section B, the studs 29 and the pivoted shoes 31 which are fixed thereto slide in the slots 49 of the section A until the shoes are released from the slots at the ends 45 thereof. With the section A removed, as just discussed, the various components of the machine will be in the positions as specifically illustrated in FIG. 2. It will be evident that before the machine is in proper order for operation as a tractor, the section B must be in fore and aft alignment with the driven part 1. In order to accomplish this the operator of the machine turns the wheels 11 of the driven part 1 in order to facilitate the movement of the driven part 1 to the left as it is viewed in FIG. 2 and into fore and aft alignment with the section B as disclosed in phantom lines in FIG. 2.

When the wheels 11 have been turned as illustrated in FIG. 2 and the outer end of the piston rod 67 has been connected to the traction wheel assembly frame by the clevis arrangement 71-73 the operator of the machine operates the proper instrumentation to cause fluid to flow through a hose 69 into the piston rod end of the hydraulic cylinder 63 so that retraction forces are imparted to the piston rod and through it to the driven part 1 of the mahcine. It will thus be apparent that when the cylinder and its components are activated as discussed there will be a force imparted to the section B to move it to the right as viewed in FIG. 2, and a force imparted to the driven part to move it to the left as viewed in FIG. 2. The resistance against such movement will, it will be apparent, be greater in the section B than in the driven element 1 and this is partly due to the fact that the wheels 11 of the driven element have been turned to facilitate movement of the driven element to the left as viewed in FIG. 2. Thus, due to this just described reaction between section B and the driven element 1 and the forces of resistance to movement imparted to each, the driven element, having less resistance to lateral movement than section B will move into proper tractor forming position as disclosed in FIG. 3.

It is desirable when the driven element 1 and the section B are in tractor forming position as particularly illustrated in FIG. 3 that some means be provided for maintaining the driven element 1 and the section B in proper tractor forming positions and insuring against relative lateral movements.

In FIG. 7 of the drawings a rigid locking bar 75 has been disclosed. When this locking bar is used the cylinder 63 and the piston rod 67 are disconnected from their fixed position as disclosed in FIG. 6 and the rigid locking bar 75 is substituted therefor. One end 77 of the locking bar is releasably fixed to the projection 65 while the other end 79 of the locking bar is provided with the clevis arrangement 71 so that it may be releasably fastened to the bracket 73. It will thus be appreciated that the locking bar 75 is fixed at one end to the driven part 1 while the other end of the locking bar is releasably fixed to the tractor wheel assembly frame 19 of the section B.

It is also within my contemplation to use the cylinder 63 and its piston rod 67 as a locking means between the driven member and the section B to prevent relative lateral movement therebetween. In the event that this method is employed as a locking means valves 75 would be combined in the flow lines 69 to the cylinder and would be closed when the driven member and the section B are in tractor forming position as disclosed in FIG. 3 so that, under the influence of the fluid in the cylinder and the closure of the lines 69, retraction or projection, of the piston rod would be prevented ensuring against lateral movement between the driven part 1 and section B.

What is claimed is:

1. Apparatus for converting an agricultural machine having a substantially wide traction wheel assembly into a tractor having a traction wheel assembly of substantially less width than the traction wheel assembly of the agricultural machine, including in combination a driven part and a traction wheel assembly of substantial width, drive means powering said traction wheel assembly, further means releasably connecting said traction wheel assembly to said driven part said traction wheel assembly formed in two sections releasably connected together for use with the agricultural machine and said sections when released from one another being separable and slideable in said further means, and one of said sections being removed from the driven part, and mechanism connected at one end to said other of said sections and at the other end to said driven part, said mechanism being operable to move said other section and said driven part laterally relative to each other to align them in fore and aft relationship for operation as a tractor.

2. Apparatus in accordance with claim 1, wherein said mechanism comprises a hydraulic cylinder having a piston operatively positioned therein and a piston rod extending from said piston fluid flow lines in communication with said cylinder and means for powering the fluid in said fluid flow lines for causing operation of the piston, and said piston rod being projectable and retractable upon the operation of said piston, said piston rod at its outer end being connected to said other section.

3. Apparatus in accordance with claim 2, wherein said other of said sections includes a plurality of traction wheels and said driven part includes steerable wheels, the number of steerable wheels being less than the number of traction wheels.

4. Apparatus in accordance with claim 3, wherein said driven part and said other of said sections each include structure imparting thereto resistance to relative lateral movement imparted thereto upon operation of said mechanism the structure in said driven part and said other of said sections imparting thereto resistance to lateral movement in said other of said sections being greater than in said driven part, whereby under the forces generated by said mechanism said driven part will move laterally relative to said other of said sections into proper fore and aft align position for operation of the machine as a tractor.

5. Apparatus in accordance with claim 4, wherein said steerable wheels on said driven part are turned in a direction to reduce the resistance of said driven part against movement.

6. A tractor including a driven part and a traction wheel assembly operable for driving said driven part, means connecting said driven part and said traction wheel assembly together and said means including structure whereby said driven part and traction wheel assembly may move laterally relative to one another, for alignment of the traction wheel assembly and the driven part in a fore and aft direction, and mechanism releasably connected to said driven part and said traction wheel assembly for causing said traction wheel assembly and the driven part to move laterally relative to one another and operable for preventing relative lateral movement therebetween when they are in alignment.

7. Apparatus in accordance with claim 2, wherein said hydraulic cylinder is removable, locking means releasably connected to said driven part and said traction wheel assembly for preventing relative movement therebetween, and said locking means being releasably connected to said driven part and said traction wheel assembly in the same manner as said hydraulic cylinder when said hydraulic cylinder is in operative position connected at one end to said other of said sections and at the other end to said driven part.

8. A method of converting an agricultural machine into a tractor wherein the machine has a driven part and a traction wheel assembly of substantial width releasably and slidably connected to said driven part and wherein the traction wheel assembly is formed in two separable sections, each being of less width than the width of the full traction wheel assembly, comprising these steps of: separating said two sections of the traction wheel assembly and removing one of them from the driven part, operating means for moving said driven part laterally relative to said traction wheel assembly to align the remaining section and said driven part in proper fore and aft relationship for operation as a tractor.

9. A method of converting an agricultural machine in accordance with claim 8, wherein said driven part has steerable wheels and turning said wheels prior to operating said means to thereby facilitate movement of the driven part relative to the traction wheel assembly.

10. A method in accordance with claim 9, wherein a hydraulic cylinder having a piston rod connected at one end to said traction wheel assembly and the cylinder is connected at one end to said driven part, turning said wheels: operating said hydraulic cylinder following turning of said steerable wheels to retract said piston rod for moving said driven part laterally relative to said traction wheel assembly.

11. A method of converting an agricultural machine in accordance with claim 10, wherein said hydraulic cylinder has valved inlet and outlet hoses: closing said valves following operation of said hydraulic cylinder, to lock said piston rod in its position following the movement of said driven part relative to said traction wheel assembly into proper fore and aft relationship for operation as a tractor.

12. A method in accordance with claim 10; wherein following lateral movement of said driven part relative to said traction wheel assembly: fastening locking means at one end to said driven part and at its other end to said traction wheel assembly, to thereby lock the driven part and traction wheel assembly in proper fore and aft position.

* * * * *